United States Patent [19]

Helms et al.

[11] Patent Number: 4,487,477

[45] Date of Patent: Dec. 11, 1984

[54] OPTICAL BEAM SPLITTER

[75] Inventors: Charles C. Helms, Trumbull; John G. Atwood, Redding, both of Conn.

[73] Assignee: The Perkin-Elmer Corporation, Norwalk, Conn.

[21] Appl. No.: 470,427

[22] Filed: Feb. 28, 1983

Related U.S. Application Data

[63] Continuation of Ser. No. 241,349, Mar. 6, 1981, abandoned.

[51] Int. Cl.³ ............................................. G02B 27/14
[52] U.S. Cl. ................................................. 350/172
[58] Field of Search ................. 350/172, 169, 33, 291, 350/17; 356/319, 435; 250/575, 578, 345

[56] References Cited

U.S. PATENT DOCUMENTS

| 3,582,664 | 1/1971 | Hrdina | 356/435 |
| 3,813,170 | 5/1974 | Sears | 350/172 |
| 3,917,406 | 11/1975 | Siegler | 350/172 |

Primary Examiner—Jon W. Henry
Attorney, Agent, or Firm—E. T. Grimes

[57] ABSTRACT

An achromatic beam splitter which is mechanically and thermally stable includes a first aperture, which aperture is overfilled, and an achromatic optical element. The aperture and element are preferably positioned in an optical plane having uniform illumination.

5 Claims, 2 Drawing Figures

OPTICAL BEAM SPLITTER

This application is a continuation of application Ser. No. 241,349, filed 3/6/81 now abandoned.

BACKGROUND OF THE INVENTION

The present invention generally relates to an optical beam splitter and, in particular, relates to an achromatic beam splitter the resultant beams of which maintain a preselected energy ratio regardless of instabilities.

Many conventional analytical instruments employ what is commonly known as a double beam technique for analyzing a sample material. In this technique, one beam is passed through a sample material under test and a second beam is passed through a reference material having known characteristics. Both beams are detected by known means and compared. By such a comparison, information about the sample material carried by the beam passed therethrough is easily discerned and evaluated.

Also, it is often true that it is desirable to pass the sample beam through a cell of the least possible volume for a given path length, whereas this is not important for the reference beam.

Quite often in the double beam technique a single light beam from an arc lamp, or other spectral source, is split into a sample beam and a reference beam. The manner by which the single beam is split, to date, has been either significantly dependent upon the wavelengths over which the splitter is to operate, or affected by relative motion of the beams and the optical elements, or both. That is, a splitter which is operational at longer wavelengths, such as the infra-red spectrum, is often not functional at shorter wavelengths, such as the ultraviolet spectrum. This is, as well known in the optical art, because, for most optical elements, the transmission and reflecting properties vary with wavelength.

One solution used to overcome the above-described difficulties is by positioning a moving light chopper in the path of the single beam and deflect the light beam passing therethrough alternately into either the reference beam path or the sample beam path.

One drawback to using a mechanical light chopper is that the reference beam and the sample beam are spaced apart in time. This time spacing complicates the data processing equipment necessary for comparing the two beams. In addition, the use of a light chopper involves rather complex mechanical and electrical apparatus for the proper and accurate operation thereof. Further, significant signal noise is introduced by the inherent mechanical inaccuracies of the chopper mechanism.

SUMMARY OF THE INVENTION

Accordingly, it is one object of the present invention to provide a stable achromatic beam splitter.

This object is accomplished, at least in part, by the use of an achromatic optical means for dividing a single beam into two light beams having a preselected ratio of light energies.

Other objects and advantages will become apparent from the following detailed description and the accompanying drawing.

BRIEF DESCRIPTION OF THE DRAWING

The drawing, not drawn to scale, comprises.

DETAILED DESCRIPTION OF THE INVENTION

Figure 1:
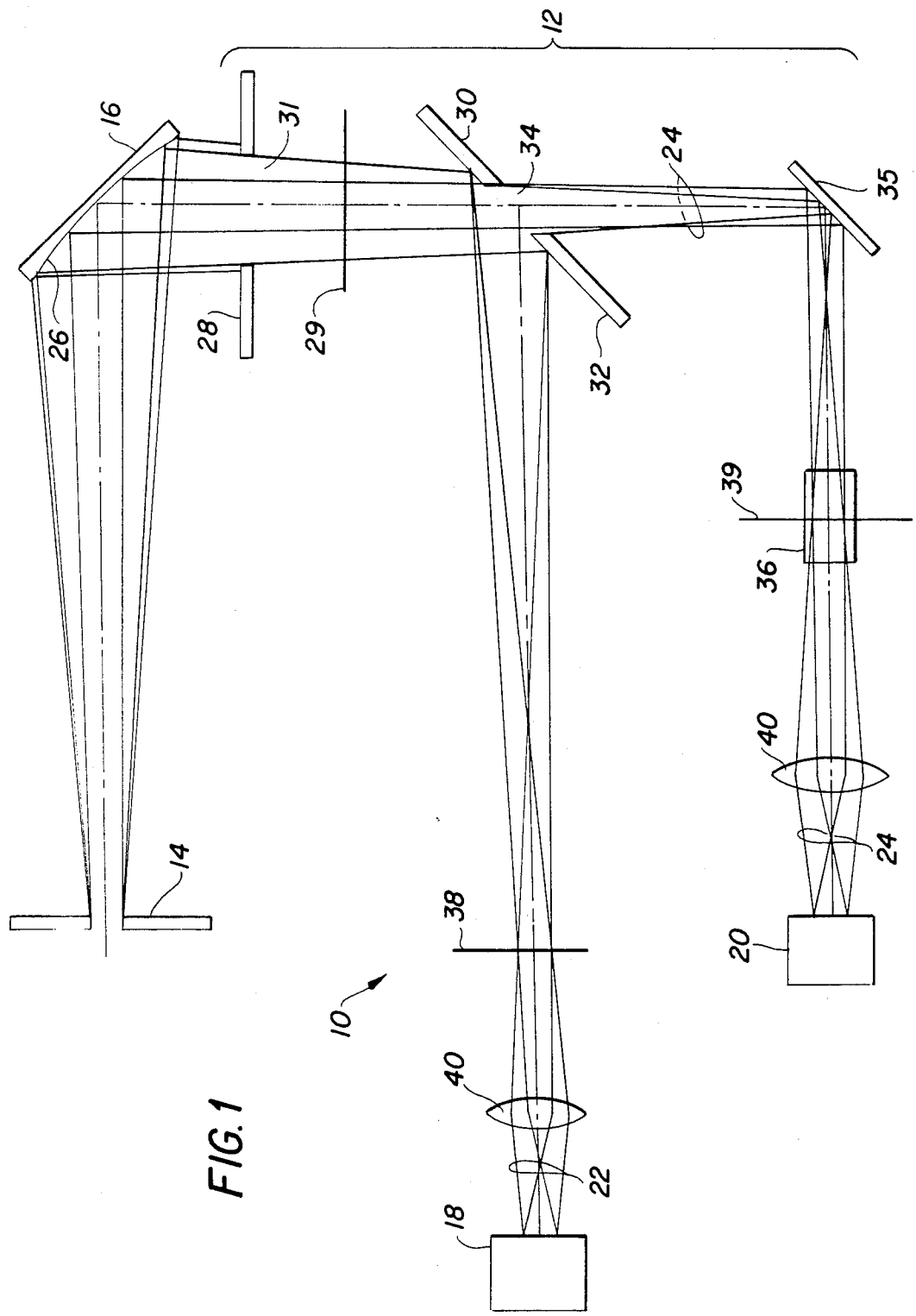
FIG. 1 which is an optical diagram of an apparatus embodying the principles of the present invention.

An optical apparatus, generally indicated at 10 in FIG. 1, embodying the principles of the present invention, includes an achromatic beam splitter 12 which is mechanically and thermally stable. In addition, in this embodiment, the optical apparatus includes a first optical stop 14, a toroidal mirror 16 which directs light passing through the first stop 14 to the beam splitter 12. This embodiment further includes a reference detector 18 and a sample detector 20 positioned in the respective paths of the resultant reference beam 22 and sample beam 24 emanating from the beam splitter 12. As more fully described below, various elements are interposed between the beam splitter 12 and the detectors, 18 and 20, in the paths of the resultant beams, 22 and 24 respectively.

In one present embodiment, the first stop 14 is, in fact, the exit slit of a monochromator, not shown in the drawing. It will be recognized, nevertheless, that the light passing through the exit slit emanates from a diffraction grating within the monochromator. It is well known in the art that within conventional monochromators the light passing therethrough is, by the optical elements therein, focused in the plane of the diffraction grating. As a result, the plane of the diffraction grating is uniformly illuminated, i.e. the light intensity is the same, or uniform, in that plane. As more fully discussed below, resultant uniform illumination in the focus plane is an optical characteristic which is beneficially exploited by the present achromatic beam splitter 12 to enhance the mechanical and thermal stability thereof.

A toroidal mirror 16 is positioned in the path of the light beam passing through the first slit 14. Preferably, the mirror 16 is positioned such that the reflecting face 26 thereof is completely illuminated. The mirror 16 directs a substantial portion of the light beam emanating from the slit 14 to the achromatic beam splitter 12. In addition, the toroidal mirror 16 forms an image of the diffraction grating. The beam splitter 12 is positioned in the plane 29 of this grating image so formed. As such, the beam splitter 12 is uniformly illuminated.

The beam splitter 12 includes a first aperture 28 and two reflective optical elements 30 and 35. Element 30 separates the light beam passing through the first aperture 28 into a first resultant beam 22 and a second resultant beam 24 which strikes element 35 at the same angle of incidence. Preferably, the first aperture 28 is overfilled, i.e. the cross-sectional area of the light beam reflected from the toroidal mirror 16 is greater than and circumferentially overlaps the entire aperture 28. Thus, even when subjected to conventional, or reasonable instabilities, the light beam striking the optical element 30 is of uniform illumination and of constant cross-sectional area, in spite of the fact that it may move with respect to element 30 in response to said instabilities. The instabilities referred to above include routine mechanical shocks as well as movement or dimensional changes due to temperature variations. For example, if the reflected beam from the toroidal mirror 16 has a diameter of about 10 millimeters and if the first aperture 28 has an opening 31 of about 7 millimeters and is centrally aligned therewith the overlap will not be exceeded by instabilities, i.e. the opening 31 will always be filled.

The achromatic optical element 30 is arranged so that all of the light passing through the first aperture 28 is projected on a first face 32 thereof with a margin to spare for relative motion of the beam with respect to element 30 and motion of element 30 with respect to the aperture 28. The optical element 30 includes a second aperture 34 therethrough the size of which is more fully discussed below, but which lies entirely within the area of illumination on the surface of element 30, with a margin to spare for relative motion of the element 30 with respect to element 28. The first face 32 is adapted to be substantially completely reflective, and by introducing another reflecting surface in the sample beam 24 the system is therefore achromatic, such a reflective face can be formed by known techniques, such as by providing a polished reflective coating, e.g. silver or aluminum, on the element 30. By this arrangement, a portion of the light projected onto the optical element 30 will pass through the second aperture 34 thereby forming the sample beam 24, which falls entirely within the reflective area of element 35 with a margin to spare for relative motion of the beam with respect to element 35. The remainder of the light projected onto the element 30 is reflected by the first face 32 to form the reference beam 22.

The relative light energy between the two resultant light beams 22 and 24 is determined by the relative size of the second aperture 34 to the amount of light projected on the first face 32. If, as preferred, the first aperture 28 and the optical element 30 are positioned as close as feasible, then the light energy of the two resultant light beams, 22 and 24, is approximately equal to the ratio of the areas of the first and second apertures 28 and 34 respectively. Preferably, the areas of the apertures, 28 and 34, are adapted to provide a light energy ratio of one (1), i.e. the light energies in the resultant beams, 22 and 24, are equal.

A further important result of this configuration is that if the shape of the aperture 34 in element 30 is an ellipse such that the cross-section of the sample beam 24 in a plane normal to its direction of propagation is roughly circular, then the total etendue of the combined beam will have been divided into a sample and a reference beam such that the sample beam will pass axially through a sample cell having the least possible volume for a given path length.

The toroidal mirror 16, the first face 32 and the element 35 are, as shown in the drawings, single surface reflective optical elements. As a consequence, the beam splitter 12 is achromatic regardless of the wavelength of the light incident thereupon.

In order to effect a practical embodiment of the achromatic beam splitter 12 it has been found that by placing the first aperture 28 and the optical element 30 in close proximity to each other beam spreading therebetween is substantially negligible. Further, by positioning the achromatic beam splitter 12 in the image plane 29 of the grating, the first aperture 28 and the optical element 30 are uniformly illuminated. In addition, it has been found that by axially aligning the center of the second aperture 34 with the first aperture 28 and by making the element 30 larger than the first aperture 28, the energy ratio of the resultant beams, 22 and 24, remains constant regardless of substantial instabilities.

Figure 2:
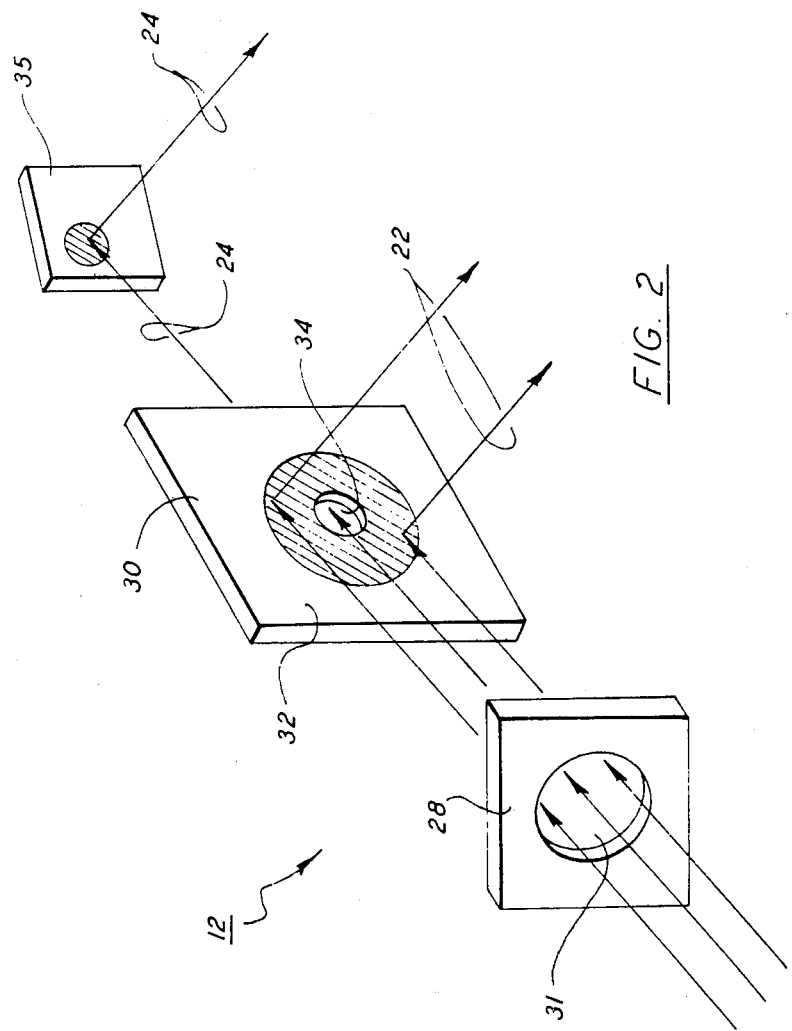
FIG. 2 which is a pictorial representation of the beam splitter portion of the apparatus shown in FIG. 1.

In one practical embodiment, shown in detail in FIG. 2, the optical element 30 is in the shape of a rectangle having sides of about 3 cm by about 2 cm. The second aperture 34 is elliptical and has an average diameter of about 3.7 millimeters. The angle of incidence of the light beam on element 30 is 45°. The cross-section of sample beam 24 is circular and can pass through a cylindrical cell of minimum volume; e.g. about 9.2 microliters for a length of about 6 mm. The element 30 is spaced apart from the first aperture 28 by about 9.5 millimeters, as measured between the centers of the first and second apertures, 28 and 34. The resultant reference beam 22, the optical element 30 and the first aperture 28 are arranged to have an included angle of about 45 degrees therebetween. The actual physical mounting of the beam splitter 12 may be accomplished by known techniques, such as by rigidly bonding the aperture 28 and element 30 in their respective positions. Alternatively, the beam splitter 12 could also be mounted into rigidly affixed frames.

In the preferred embodiment, a mirror 35 is positioned in the path of the sample beam 24 at the same angle of incidence as an element 30. As a result, the number of optical reflections of the resultant beams 22 and 24 is equalized. Such an equalization further ensures that the apparatus 10 is achromatic.

As shown in FIG. 1, the reference beam 22 and the sample beam 24 form images of the slit 14 in planes 38 and 39 respectively both an effective distance 'd' beyond element 30. To take maximum advantage of the uniform illumination, a sample cell 36 containing the sample material being analyzed is positioned so that the center thereof is located in the image planes 38 and 39. Subsequent to forming the image of the slit 14 in the image planes 38 the beams, 22 and 24, are focused, using known optical elements 40 such as lenses, on the reference detector 18 and sample detector 20. One technique of making absorption liquid chromatography measurements which is particularly benefitted by the apparatus 10 is described in an article entitled "New Techniques with UV detectors aid full HPLC use", by A. F. Poile, R. D. Conlon and L. S. Ettre published in Industrial Research & Development - February 1981, pp. 147-153.

Although the present invention has been described herein with reference to a particular embodiment, it will be understood that this description is exemplary in nature and is not considered as a limitation on the scope of the invention. The scope and spirit of the present invention is therefore only limited by the appended claims and the reasonable interpretation thereof.

What is claimed is:

1. An achromatic beam splitter apparatus comprising:
   a first optical element, said first element having a first aperture therethrough, said aperture being adapted to act as an optical stop when positioned in the path of a light beam from a light source;
   a single reflective achromatic means for directing said light beam onto said first optical element, and single surface reflective directing means being arranged to direct said light beam onto said first element such that said light beam uniformly illuminates and overfills said first aperture whereby said first aperture is always filled regardless of mechanical instabilities; and
   a single surface reflective achromatic optical means, having a second aperture therethrough, positioned so as to receive all of said light beam passing through said first optical element, for dividing said light beam received into two resultant light beams, one resultant light beam being that portion of said light beam reflected by the single reflective surface of said optical means and the other resultant light beam being that portion of said light beam passing through said second aperture of said optical means, said optical means being adapted to maintain a constant preselected ratio of light energies between said resultant light beams regardless of mechanical instabilities.

2. Apparatus as claimed in claim 1 further comprising:
a reflecting surface in the path of said other resultant light beam of said light beam.

3. Apparatus as claimed in claim 2 wherein the ratio of the area of light impinging on said optical means to the area of said second aperture is equal to said preselected ratio of energies.

4. Apparatus as claimed in claims 2 or 3 wherein said second aperture of said optical means is elliptical and said optical means is positioned, with respect to said first element, such that said second aperture of said optical means is effectively circular whereby said other resultant light beam of said light beam has a circular cross-section perpendicular to the direction of beam travel.

5. Apparatus as claimed in claims 1, 2 or 3 wherein said ratio of energies of said light beams is equal to unity.

* * * * *

UNITED STATES PATENT AND TRADEMARK OFFICE
CERTIFICATE OF CORRECTION

PATENT NO. : 4,487,477

DATED : December 11, 1984

INVENTOR(S) : Charles C. Helms, John G. Atwood

It is certified that error appears in the above-identified patent and that said Letters Patent is hereby corrected as shown below:

Column 4, line 53, insert after the word "single" --surface--.

Signed and Sealed this

Twenty-eighth Day of May 1985

[SEAL]

Attest:

DONALD J. QUIGG

Attesting Officer — Acting Commissioner of Patents and Trademarks